United States Patent [19]

Eplan

[11] 4,225,106
[45] Sep. 30, 1980

[54] HAIR DRYER HOLDER

[76] Inventor: Joseph J. Eplan, 15083 London Rd., Philadelphia, Pa. 19116

[21] Appl. No.: 962,863

[22] Filed: Nov. 22, 1978

[51] Int. Cl.² ............................................. A47F 5/00
[52] U.S. Cl. ................................. 248/309 R; 248/282
[58] Field of Search ................... 248/309 R, 310, 314, 248/282, 283, 103, 316 R

[56] References Cited

U.S. PATENT DOCUMENTS

| 200,082 | 2/1878 | Nolan | 248/309 X |
|---|---|---|---|
| 853,118 | 5/1907 | Richey | 248/309 X |
| 956,911 | 5/1910 | Vick | 248/282 |
| 1,002,783 | 9/1911 | Sweet | 248/282 |
| 1,020,136 | 3/1912 | Feely | 248/103 |
| 2,415,186 | 2/1947 | Moore | 248/103 |
| 2,626,045 | 1/1953 | Van Over et al. | 248/282 X |
| 3,207,317 | 9/1965 | Moore et al. | 248/309 X |
| 3,376,007 | 4/1968 | Chesterley | 248/282 |

Primary Examiner—J. Franklin Foss
Attorney, Agent, or Firm—Caesar, Rivise, Bernstein & Cohen, Ltd.

[57] ABSTRACT

Apparatus for supporting an electrical hair drier or other hand-held electrical device having a hand grip portion and a barrel portion extending therefrom. The apparatus includes a bracket on which an arm is pivotably secured. A holder, having an elongated slot, is pivotably secured on the end of the arm. The holder includes a yoke at its free end. The drier is supported in the holder with its hand grip portion in the slot and its barrel portion supported in the yoke. Resilient straps are provided to releasably secure the device in place. The bracket is arranged to be secured to a support wall or other member.

4 Claims, 5 Drawing Figures

HAIR DRYER HOLDER

This invention relates generally to supports, and more particularly, to adjustable supports for electrical hair driers or other hand-held devices to enable such devices to be supported and held in a fixed but adjustable position.

A large number of relatively small, lightweight, hand-held electrical hair driers are commercially available today. One of the most common type of hair drier is the "gun" type wherein the drier is shaped like a hand-gun and includes a hand grip portion with a barrel portion extending therefrom and out of which barrel portion hot air is forced. Another type of hair drier is of a generally cylindrical or barrel shape and is arranged to be gripped at the rear thereof.

In order to use prior art consumer hair driers the user normally holds the drier in one hand adjacent to his or her head so that the hot air exiting from the outlet of the drier impinges on the user's hair. This mode of operation presents several drawbacks. For example, the user's arm may become tired after holding the drier up for a sustained period of time, notwithstanding the fact that commercially available driers are relatively lightweight. Moreover, since the user has to hold the drier in one hand adjacent his or her head, this severely limits the user's ability to style his or her hair during the drying operation.

While large, commercial bonnet-type hair driers include stands for supporting the hair drying bonnet over the user's head, and some supports have been disclosed for consumer-type, hand-held hair driers, no devices are available for supporting and holding conventional consumer-type hand-held hair driers in adjustable positions adjacent the user's head to free the user's hands for other purposes during the drying operation. For example, in U.S. Pat. No. 3,964,708 (Reeves) there is disclosed a hand drier cradle for a hand-held, gun-type, hair drier. The cradle is arranged to be mounted either vertically or horizontally and includes an opening for receiving the barrel end of the hair drier to hold the hair drier when it is not used. In U.S. Pat. No. 3,518,776 (Wolff et al) there is disclosed a specially constructed, cylindrically shaped, hair drier having a mating tubular housing support into which the hair drier fits. The housing support is pivotably mounted on the upper end of a vertically telescoping bar. While the support in the Wolff et al patent appears suitable for holding the hair drier in position during use, and for making some positional adjustments, it is clear that the support is only suitable for use with the cylindrical hair drier disclosed in the patent, and cannot accommodate conventional gun-type hair driers.

Accordingly, it is a general object of the instant invention to provide apparatus for adjustably supporting commercially available, hand-held, hair driers, and which overcomes the disadvantages of the prior art.

It is a further object of this invention to provide apparatus for supporting and holding hand-held hair driers which are simple in construction and low in cost.

It is still a further object of the instant invention to provide apparatus for supporting and holding commercially available hair driers in a multitude of positions adjacent the user's head to free the user's hands for other purposes.

These and other objects of the instant invention are achieved by providing apparatus for supporting a hand-held electrical device having a hand grip from which a barrel extends. The apparatus comprises a support arranged for mounting on a vertical member, an arm pivotably connected to the support and having a free end to which an elongated holder is connected. The holder includes an opening therein adapted to receive the hand grip portion of the device. Yoke means is provided at the free end of the holder and into which the barrel portion of the device is disposed when the hand grip is in the opening. Hold-down means are provided for securing the device in place on the holder.

Other objects and many of the attendant advantages of the instant invention will be readily appreciated as the same becomes better understood by reference to the following detailed description when considered in connection with the accompany drawing, wherein.

Figure 1:
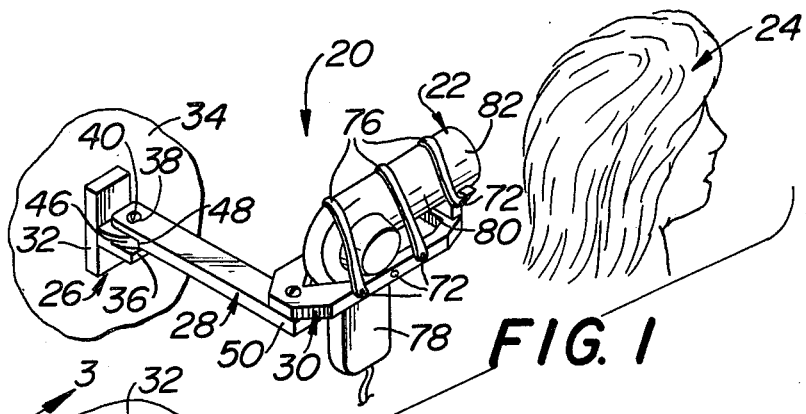
FIG. 1 is a perspective view of the apparatus of the instant invention, supporting a conventional, gun-type, consumer hair drier adjacent the head of the user.

Referring now to the various figures of the drawing wherein like reference characters refer to like parts, there is shown at 20 in FIG. 1 apparatus for supporting and holding a conventional, commercially available, hair drier 22 in position adjacent to the head 24 of a user so that the user's hair can be dried without requiring the user to hold the drier during the drying operation.

The apparatus 20 basically comprises a support or bracket 26, arm 28 and a holder 30 and can be formed of any suitable material, e.g., plastic, wood, metal, etc. The bracket 26 includes a base portion 32 which is arranged to be secured by conventional means, e.g., screws, adhesive, etc., to a vertical support member, such as wall 34. The bracket 26 includes a flange 36 projecting normally from the base portion 32 and is disposed horizontally when the bracket is mounted on the wall.

Figure 2:
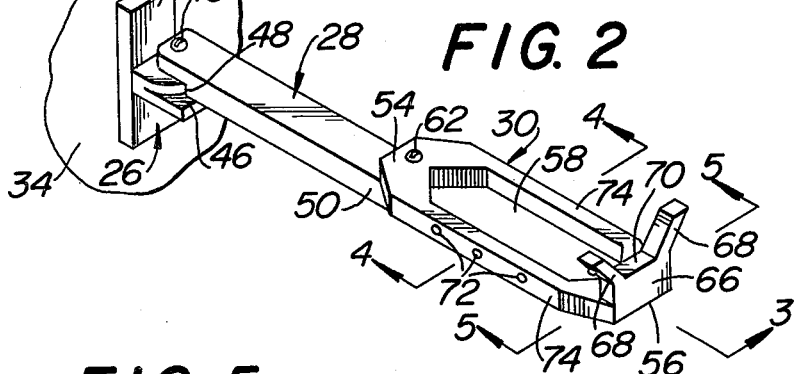
FIG. 2 is an enlarged perspective view of the apparatus shown in FIG. 1.
Figure 3:
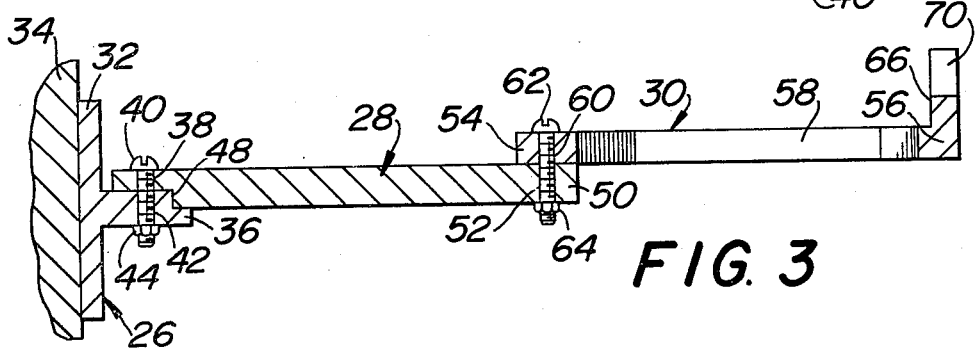
FIG. 3 is an enlarged sectional view taken along line 3—3 of FIG. 2.

The arm 28 is an elongated member having a hole 38 at one end thereof, through which a bolt 40 extends. The flange 36 includes a hole 42 (FIG. 3) through which the bolt 40 also extends to secure the arm 28 on the flange 36 of bracket 26 and to permit the arm to pivot about the axis of the bolt. A nut 44 (FIG. 3) is threadedly engaged on the bolt 40. As shown clearly in FIGS. 1, 2 and 3 the upper surface of the flange 36 of bracket 26 includes an undercut raceway 46. A corresponding raceway 48 is undercut at the end of arm 28 adjacent the opening 38 to enable the arm 28 to mate with the bracket and to pivot about the vertical axis established by the bolt 40. The opposite end 50 of the arm 28 includes a hold 52.

The holder 30 basically comprises an elongated planar member having a pair of ends 54 and 56 with an elongated slot 58 extending therebetween. A hole 60 is provided in the end 54 of the holder 30. The holder 30 is adapted to be pivotably secured to the end 50 of the arm 28. To that end the hole 60 in the holder is aligned with the hole 52 in the arm 28 and a bolt 62 is extended through the aligned holes. A nut 64 holds the bolt in place. Accordingly, holder 30 can be pivoted about the vertical axis of the bolt 62 at the end of arm 28.

The free end 56 of the holder 30 includes a yoke 66. The yoke is of a generally Y-shaped configuration having a pair of angularly upward extending legs 68, defining a generally V-shaped space or cradle 70 therebetween.

Figure 5:
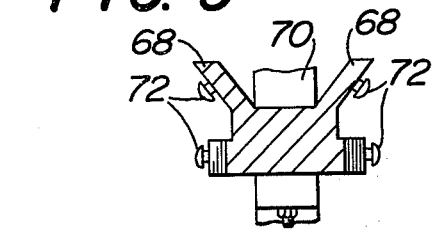
FIG. 5 is an enlarged sectional view taken along line 5—5 of FIG. 2.
Figure 4:
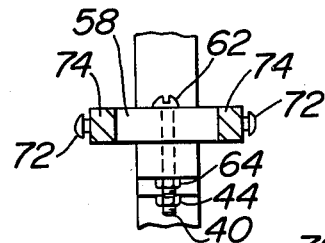
FIG. 4 is an enlarged sectional view taken along line 4—4 of FIG. 2.

A plurality of hooks 72 are provided along the outer side walls 74 of the holder 30. As can be seen in FIG. 5 the hooks 72 are of a generally cap-like construction. The outside surface of each of the legs 68 of the yoke 66 also includes a cap-like hook 72, as shown in FIG. 5. The hooks 72, as will be described hereinafter, co-act with hold-down means 76 to hold the hair drier 22 securely in place on the holder 30.

In accordance with the preferred aspects of the invention, the hold-down means 76 comprise a plurality of resilient, e.g., rubber, straps. Each strap includes an opening at each end through which a respective hook 72 on the holder 30 extends to releasably secure the strap in place.

The mounting and securement of the hair drier 22 is accomplished as follows: the hand grip portion 78 of the drier is extended through the elongated slot 58 in the holder 30 while the barrel 80 extends along the slot with its free end 82 located within the cradle portion 70 of the yoke 66. The width of the slot 58 in the holder 30, that is, the distance between the sidewalls 74, is large enough to enable hand grips 78 of conventional driers to extend therethrough but narrow enough so that the barrel portions 80 or other portions of the driers do not pass therethrough. Accordingly, when the hand grip portion extends through the slot 58, the drier is held in position by portions of the holder contiguous with the slot 58 as well as by the yoke 66. The hold-down straps 76 are then extended across the barrel 80 of the drier and hooked onto opposed hooks 72 on either side of the holder. This action releasably secures the drier in place on the holder 30.

As will be appreciated from the foregoing, since the arm is pivotable about the axis of bolt 40, and since the holder 30 is pivotable about the axis of bolt 62 the drier can be moved to any orientation within a horizontal plane by the articulation of the arm 28 and the holder 30. This feature enables one to orient the drier at all positions with respect to the user's head 24, thereby enabling the efficient and effective use of the drier while freeing the user's hands for styling or other purposes. When use of the drier is no longer required the drier is removed from the holder and the apparatus pivoted until it lies along the wall. This fold-away feature is of considerable importance for home applications as well as beauty salon or other commercial applications.

While the hair drier 22 shown in FIG. 1 is of the gun-type it must be pointed out that the apparatus 20 of the instant invention is not limited to use with such hair driers. Accordingly, the apparatus 20 can be used with various shaped, commercially available, e.g., cylindrical or barrel type, etc. hair driers.

For example, a cylindrical or barrel-type hair drier is disposed on the holder 30 by locating one end of the barrel within the yoke 66 and disposing the other end of the barrel on the top of the rear portion 54 of the holder. The resilient straps 76 are then extended over the barrel to secure the barrel in place and prevent it from moving off the holder.

It must also be pointed out at this juncture that the apparatus 20 can be used for supporting numerous small, hand-held, electrical devices other than driers, e.g., automobile ignition timing lamps, hand drills, etc., to free the user's hands during operation of the device.

It must also be pointed out at this juncture that while the apparatus 20 is shown arranged for supporting the holder 30 in various positions in a horizontal plane, it is clear that the apparatus can be arranged for supporting the holder in other planes, e.g., vertical, as well.

Furthermore, it will be appreciated by those skilled in the art, the bracket 26 need not be mounted on a permanent vertical surface, such as wall 34, but can be modified for connection to a movable or temporary support structure, such as a tripod, vertical stand, etc. Such a modification provides even more flexibility in positioning the device with respect to the user.

As will be appreciated from the foregoing, the apparatus 20 of the instant device is simple in construction and enables one to hold small, hand-held, electrical appliances in various positions, without necessitating use of the user's hands. Furthermore, the articulated nature of the apparatus 20 enables one to adjust the positioning of the device as required.

Without further elaboration, the foregoing will so fully illustrate my invention that others may, by applying current or future knowledge, readily adapt the same for use under various conditions of service.

What is claimed as the invention is:

1. Apparatus for supporting a hand-held electrical hair drier having a hand-grip portion from which an elongated barrel portion extends, said apparatus comprising a support arranged for securement on a vertical member, an arm pivotly connected to said support and having an end in the form of an elongated holder, said arm being pivotable about a vertical axis to move said holder to various positions in a horizontal plane, said holder comprising a base having a free end, said base having an elongated slot therein adapted to receive the hand-grip portion of said hair drier, the free end of said base including yoke means comprising a pair of upstanding legs forming a cradle therebetween in which the barrel portion of said hair drier is disposed when said hand-grip is in said opening.

2. The apparatus of claim 1 additionally comprising hold-down means for securing the hair drier in place on said support.

3. The apparatus of claim 2 wherein said hold-down means comprise at least one resilient strap.

4. The apparatus of claim 3 wherein said strap is releasably secured across said base to engage the barrel portion of said hair drier.

* * * * *